H. A. EATON.
ALARM SIGNAL.
No. 10,295. Reissued Mar. 13, 1883.
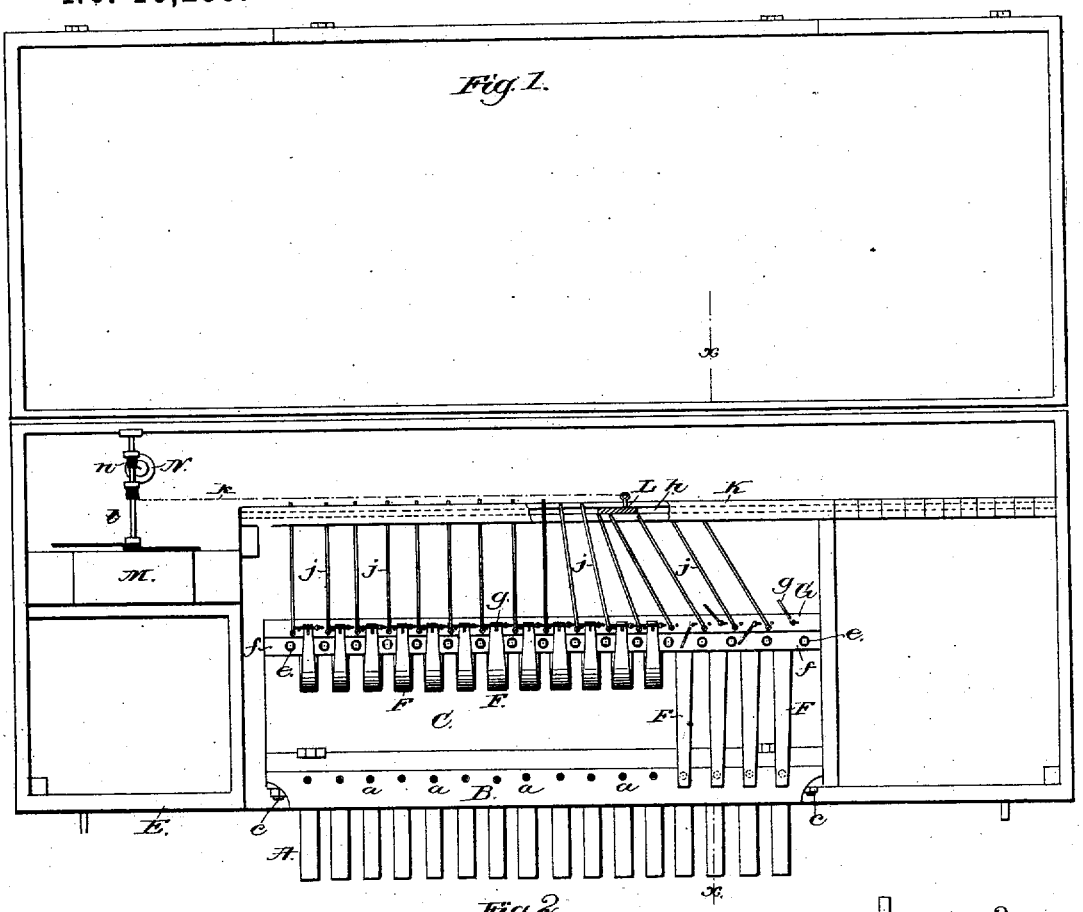
Witnesses.
John F. C. Reinhart
A. O. Orne.
Inventor:
Hiram A. Eaton
by Crosby & Gregory
attys.
N. PETERS, Photo-Lithographer, Washington, D. C.

UNITED STATES PATENT OFFICE.

HIRAM A. EATON, OF MANCHESTER, MAINE.

ALARM-SIGNAL.

SPECIFICATION forming part of Reissued Letters Patent No. 10,295, dated March 13, 1883.

Original No. 253,687, dated February 14, 1882. Application for reissue filed January 29, 1883.

*To all whom it may concern:*

Be it known that I, HIRAM A. EATON, of Manchester, in the county of Kennebec and State of Maine, have invented a new and Improved Automatic Alarm or Signal, of which the following is a full, clear, and exact description.

My invention consists of a machine, device, or gun adapted to automatically give a series of explosions or discharges at stated intervals of time, and also of certain special constructions, as hereinafter described.

In some instances I shall carry my invention into effect by the employment of a series of horizontally-arranged barrels adapted to receive fixed or loose ammunition to be exploded by suitable hammers actuated by springs or weights and arranged to be released at intervals by clock mechanism. In other instances the series of barrels will not be stationary, but will be made to automatically revolve or move around a center, and in still other instances, instead of using a spring or weight mechanism for causing the explosions, other mechanism, as a fuse and traveling-lamp, might be used.

Reference is to be had to the accompanying drawings, forming part of this specification, in which similar letters of reference indicate corresponding parts in all the figures.

Figure 1 is a plan view of the preferred plan of carrying out my invention, the barrels being arranged horizontally and adapted to be discharged by spring-actuated hammers controlled by clock mechanism, the whole being contained in a suitable box or housing. Fig. 2 is a sectional elevation of the same, taken on the line *x x* of Fig. 1. Fig. 3 is a detailed view, showing the manner of retaining the ends of the springs, and Fig. 4 is a plan view of a safety-plate for locking the springs during handling or transportation of the machine.

In the construction shown in the drawings the barrels A (sixteen in number) are adapted to be loaded from the muzzle and to be discharged by means of percussion-caps. The barrels are secured in the cast-metal breech-block B, which is formed with the series of nipples or tubes *a*, upon which caps are placed for explosion, and is suitably perforated to conduct the spark from the caps to the charge of powder in the barrels. The breech-block B is secured by the bolts *c c* to the bar of wood D, which is hinged to the board C, secured upon the bottom board, *d*, of the box or housing E, so that the whole series of barrels may be turned up to the position shown in dotted lines entirely within the box or housing—the position they will occupy when the machine is not in use. When in use the barrels will be turned down to the position shown in full lines, so that the muzzles of the barrels will project out of the box or housing, and the nipples or tubes *a* be held in position to be struck by the lugs or projections *i*, carried by springs F, the said lugs or projections acting as hammers to explode the caps and fire the barrels. The springs are properly clamped and held at their rear ends upon the board C by means of the bolts *e* and the strip *f*, and are adapted to be bent upward and backward and held as shown in the drawings, and released successively at the proper intervals of time to fire the barrels in the determined order. The springs and attached hammers are held in their backwardly-bent or cocked position by means of the linked wires *g* and the pivoted rods or arms *j* upon the cross-bar G, the wires *g* being adapted to be placed over the ends of the springs and under the rods or arms *j*, as shown clearly in Fig. 3, the ends of the arms or bars *j* being placed in the slot *h* of the bar K to be struck by the traveling block or releasing device L. The wires *g* are of such length that they will be retained under the arms or rods *j* when the latter stand at or near right angles to the wires, but will be released when the arms or rods are swung or moved to a greater angle therewith, thus releasing the springs, as clearly illustrated in Fig. 1. This moving of the arms or rods for releasing the wires is accomplished by means of the traveling block L or releasing device, which moves in suitable ways formed in the slotted plate K, as shown in Fig. 2, the movement of the block being accomplished by the clock M, which is attached to the said traveling block by the cord *k*, which passes over the spindle *l*, which is turned by the hour-post of the clock. In order to insure the movement of the block and to relieve the clock mechanism of a portion of the work, I provide the spindle *l* with the cord *n* and weight N, which will be wound on the said spindle as the block is moved outward to the end of the slotted plate K. The weight is thus made to assist in returning the block, as will be readily understood. The spindle *l*, at the point where the cord *k* winds around it, has a circumference equal to the distance between the pivoted rods or arms *j*, so that the block will release one of the springs at each revolution of the spindle. The plate or guide K is extended past the series of barrels, and its extended portion is marked off, as shown in Fig. 1, into spaces equal to and less than the space between the arms or rods *j*, so that the block may be set to allow any desired length of time to intervene between the time of setting and the time at which it is desired to have the firing begin, the interval of time between setting and firing the first barrel of the series depending upon the length of the plate or guide K beyond the farthest barrel of the series of barrels and the diameter of the spindle.

Arranged as above described the explosions will occur at intervals of one hour; but it will be understood that the time between the explosions may be lengthened or diminished by using a larger or smaller spindle; or the intervals may be increased with the same spindle by loading only every other barrel, and by increasing or diminishing the speed of the spindle by means of the clock this result may also be accomplished.

My invention is especially adapted to be placed in rice-fields, corn-fields, and other fields of grain for frightening away crows and other mischievous birds and animals, requiring no attendance except to charge the barrels and wind and set the clock and firing mechanism.

The board P (shown in Fig. 4) is perforated with as many holes *t* as there are arms or rods *j*, and is adapted to be placed upon the ends of said rods back of the slotted bar K, for locking or holding the rods and the spring when the machine is being handled or transported.

I am aware that it is not broadly new to arrange a number of barrels so that they may be tilted together, or to connect them with mechanism by which they may be fired separately or together; but I am not aware that a clock mechanism has ever been employed to at a stated time effect the firing of a barrel and thereafter continue to fire other barrels of a series of barrels at measured intervals.

I claim—

1. In an alarm-signal, a series of barrels to contain ammunition, a series of hammers or projections co-operating therewith, and means to hold the said hammers or projections ready when released to fire the barrels, and an extended plate or guide, and traveling block or releasing device therein to effect the release of the hammers to fire the barrels, combined with a clock-actuated spindle, and connected with the said block-releasing device, whereby the first barrel of the series of barrels may be fired automatically at any desired hour after setting or cocking the hammers, and the remaining barrels be thereafter fired at predetermined intervals, substantially as described.

2. The series of barrels, and series of hammers, means to hold them retracted, and a plate or guide of greater length than the length of the space occupied by the said hammers, combined with a traveling block or releasing device, and a clock-actuated spindle to move the same and automatically determine the hour of the day at which the first barrel of the series of barrels will be fired, and also the interval of time between firing each successive barrel of the series of barrels, substantially as described.

3. In an alarm-signal, the hammer-actuating springs, wires *g*, and rods to hold the latter, combined with the plate or guide and traveling block or releasing device adapted to move the said rods one after the other to effect the release of the said springs, substantially as described.

4. In an alarm-signal, the bar K, having slot *h*, and the slide-bar made movable therein, combined with the pivoted rods actuated by the slide, and the wires to hold the hammers, substantially as described.

5. The combination, with the barrels, nipples, and box having board C on its bottom, of a breech-block, B, formed with right-angled apertures and bolted to a bar hinged to said board C, as described.

6. The combination, with the springs *i*, of the wires *g*, the arms *j*, pivoted on cross-bar G, and the bar K, having slot *h*, whereby the wires *g* may be placed over the ends of the spring and under the arms, while the arms are placed in slot *h*, to hold the springs back, as described.

7. In an alarm-signal, a series of barrels to contain ammunition, a spindle, *b*, moved in unison with the hour-post of a clock mechanism, combined with a hammer releasing or controlling device connected with and actuated by the said spindle to control the intervals of time between firing the said barrels, substantially as described.

In testimony whereof I have hereunto signed my name in the presence of two subscribing witnesses.

HIRAM A. EATON.

Witnesses:
G. W. GREGORY,
BERNICE J. NOYES.